United States Patent
Nagao et al.

(10) Patent No.: US 9,061,633 B2
(45) Date of Patent: Jun. 23, 2015

(54) TONNEAU COVER DEVICE

(75) Inventors: Takashi Nagao, Aichi (JP); Hiroyuki Mori, Nagoya (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 14/004,026

(22) PCT Filed: Mar. 23, 2012

(86) PCT No.: PCT/JP2012/002026
§ 371 (c)(1),
(2), (4) Date: Sep. 9, 2013

(87) PCT Pub. No.: WO2012/132366
PCT Pub. Date: Oct. 4, 2012

(65) Prior Publication Data
US 2013/0341950 A1    Dec. 26, 2013

(30) Foreign Application Priority Data

Mar. 30, 2011  (JP) ................... 2011-075518

(51) Int. Cl.
*B60R 5/04* (2006.01)

(52) U.S. Cl.
CPC .. *B60R 5/04* (2013.01); *B60R 5/047* (2013.01)

(58) Field of Classification Search
CPC ...... B41J 2/415; B60C 13/002; B60C 1/0025; B60C 2013/045; B60R 5/047; B60R 5/044; B60R 1/07; B60R 5/04
USPC .......... 296/37.16, 24.43, 98, 100.15; 160/370.22
See application file for complete search history.

(56) References Cited

U.S. PATENT DOCUMENTS

| | | | |
|---|---|---|---|
| 6,003,920 A * | 12/1999 | Crisp | 296/37.1 |
| 6,402,217 B1 * | 6/2002 | Ament et al. | 296/37.16 |
| 7,021,692 B2 * | 4/2006 | Laudenbach et al. | 296/76 |
| 7,537,265 B2 * | 5/2009 | Hori et al. | 296/100.15 |
| 7,857,372 B2 * | 12/2010 | Fukushima et al. | 296/37.16 |

(Continued)

FOREIGN PATENT DOCUMENTS

| | | |
|---|---|---|
| DE | 102005055625 | 5/2007 |
| EP | 1400385 | 3/2004 |

(Continued)

OTHER PUBLICATIONS

U.S. Appl. No. 14/006,779 to Shinichi Miyazaki et al., filed Sep. 23, 2013.

(Continued)

*Primary Examiner* — Glenn Dayoan
*Assistant Examiner* — Sunsurraye Westbrook
(74) *Attorney, Agent, or Firm* — Greenblum & Bernstein, P.L.C.

(57) ABSTRACT

A tonneau cover device includes a tonneau cover attached to a hatchback door. A movable guide is arranged on the tonneau cover and is guided by a fixed guide, which is arranged in a vehicle. The tonneau cover moves to an extension position when the hatchback door closes and a storage position when the hatchback door opens. A detector detects whether movement of the tonneau cover is obstructed due to contact with an object. A controller moves the tonneau cover to where the movable guide can come into contact with the fixed guide in a state in which the hatchback door is open when the detector detects that the movement of the tonneau cover to the storage position has been obstructed.

5 Claims, 2 Drawing Sheets

(56) References Cited

U.S. PATENT DOCUMENTS

2005/0012352 A1* 1/2005 Sparrer et al. ............. 296/24.43
2009/0243321 A1 10/2009 Fukushima et al.

FOREIGN PATENT DOCUMENTS

| JP | 2010-012983 | 1/2010 |
|---|---|---|
| JP | 2010-012984 | 1/2010 |
| JP | 2011-42206 | 3/2011 |

OTHER PUBLICATIONS

U.S. Appl. No. 14/006,800 to Takashi Nagao et al., filed Sep. 23, 2013.
U.S. Appl. No. 14/003,101 to Takashi Nagao et al., filed Sep. 4, 2013.
International Search Report dated Jun. 28, 2012.
Japan Office action, mail date May 20, 2014.

* cited by examiner

TONNEAU COVER DEVICE

TECHNICAL FIELD

The present invention relates to a tonneau cover device.

BACKGROUND ART

Tonneau cover devices are used in vehicles to conceal cargo in cargo compartments and thereby improve security. Japanese Laid-Open Patent Publication No. 2010-12984 describes a tonneau device that horizontally moves a tonneau cover with an electric motor.

CITATION LIST

Patent Literature

[PTL 1]
Japanese Laid-Open Patent Publication No. 2010-12984

SUMMARY OF INVENTION

A referential example of a tonneau cover device will now be described with reference to FIG. 3. The tonneau cover device includes a tonneau cover body 40, which is arranged in the inner side of a hatchback door 45. The tonneau cover body 40 includes a tonneau cover 42, a roller 43, a case 46, and a motor 41.

The roller 43 is rod-shaped. The roller 43 is supported to be rotatable about its axis by the case 46. The tonneau cover 42 has a basal end fixed to the circumferential surface of the roller 43. The motor 41 drives a telescopic or expandable link mechanism 49 that rolls the tonneau cover 42 out of or into the case 46. The roller 43 is rotated in a forward direction or reverse direction in accordance with the movement direction of the tonneau cover 42.

Referring to FIG. 4, the link mechanism 49 is arranged under the tonneau cover 42. The link mechanism 49 is extended and retracted by the motor 41. The tonneau cover 42 includes a distal end fixed to the link mechanism 49. The link mechanism 49 applies tension to the tonneau cover 42 in cooperation with a spring (not shown) incorporated in the roller 43. The link mechanism includes movable guides 49a, which project sideward from opposite sides of the distal end of the tonneau cover 42.

Two fixed guides 48 are arranged in the cargo compartment of a vehicle and extend in the front to rear direction of the vehicle. The two fixed guides 48 face each other in the widthwise direction of the vehicle. When the motor 41 is driven in a state in which the hatchback door 45 is closed, the movable guides 49a and the tonneau cover 42 move along the fixed guides 48 in accordance with the extension or retraction of the link mechanism 49.

The distal end of the tonneau cover 42 moves between a storage position and an extension position. When in the storage position, the tonneau cover 42 is rolled up around the roller 43 and stored in the case 46. When the distal end is in the extension position, the tonneau cover 42 is completely rolled out from the roller 43. In this state, the distal end of the tonneau cover 42 is arranged in the vicinity of the rear surface of a rear seat. Thus, when the distal end of the tonneau cover 42 is located at the extension position, the tonneau cover 42 conceals cargo that is placed in the cargo compartment under the tonneau cover 42. The extension position may be referred to as a maximum extension position.

In the tonneau cover device of the referential example, as the tonneau cover 42 moves to the storage position, the tonneau cover 42 or the link mechanism 49 may come into contact with an object in the cargo compartment. This may obstruct movement of the tonneau cover 42. When such obstruction is detected during movement of the tonneau cover 42 to the storage position, the tonneau cover 42 is automatically pulled out by a length (several centimeters) that is sufficient for resolving contact of the tonneau cover 42 or link mechanism 49 with the object. Then, the movement of the tonneau cover 42 is stopped at the pulled-out position where there is no contact with the cargo.

However, the tonneau cover 42 stops moving and remains at a midway position. Thus, as shown by the broken lines in FIG. 3, the movable guides 49a would be greatly separated from the fixed guides 48 when the hatchback door 45 is open. In this case, when closing the hatchback door 45, the user would have to place the movable guides 49a on the fixed guides 48 while holding the hatchback door 45 in a partially closed state. This is a burdensome task.

It is an object of the present invention that provides a tonneau cover device with improved convenience.

One aspect of the present invention is a tonneau cover device provided with a tonneau cover that includes a basal end, which is attached to an inner side of a door at the back of a vehicle, and an opposite distal end. A movable guide is arranged on the tonneau cover. The movable guide is guided by a fixed guide, which is arranged in the vehicle to move the movable guide in a horizontal direction. The tonneau cover moves to an extension position, at which the distal end is farthest from the basal end, when the door closes. Further, the tonneau cover moves to a storage position, at which the distal end is closest to the basal end, when the door opens. A detector detects whether movement of the tonneau cover is obstructed due to contact with an object. The controller moves the tonneau cover to a contactable position at which the movable guide can come into contact with or be joined with the fixed guide in a state in which the door is open when the detector detects that the movement of the tonneau cover to the storage position has been obstructed.

A further aspect of the present invention is a tonneau cover device used with a fixed guide arranged in a cargo compartment of a vehicle. The tonneau cover device includes a tonneau cover arranged in a hinged hatchback door of the vehicle that opens upward. The tonneau cover is movable between a storage position and a maximum extension position. A motor moves the tonneau cover to the storage position and the maximum extension position. A tonneau cover sensor detects a position and movement of the tonneau cover. A movable guide is moved integrally with the tonneau cover while contacting the fixed guide when the tonneau cover moves in the cargo compartment. The movable guide is separated from the fixed guide when the hatchback door is fully open. A controller is connected to a door sensor that detects when the hatchback door opens. The controller drives the motor in accordance with signals provided from the door sensor and the tonneau cover sensor. The controller stores a set value of an extension length corresponding to a contactable of the tonneau cover that allows the movable guide to contact the fixed guide when the hatchback door is fully open. When detecting that the tonneau cover has stopped moving toward the storage position during a period from when the hatchback door starts to open to when the hatchback door fully opens, the controller drives the motor in accordance with the extension length set value to move the tonneau cover to the contactable position that allows the movable guide to contact the fixed guide when the hatchback door is fully open.

The present invention provides a tonneau cover device with improved convenience.

Other aspects and advantages of the present invention will become apparent from the following description, taken in conjunction with the accompanying drawings, illustrating by way of example the principles of the invention.

BRIEF DESCRIPTION OF DRAWINGS

FIG. 1 is a block diagram of a vehicle and a tonneau cover device.
FIG. 2 is a cross-sectional diagram of a tonneau cover device.
FIG. 3 is a cross-sectional diagram of a tonneau cover device in a referential example.
FIG. 4 is a perspective view showing the tonneau cover device of FIG. 3.

DESCRIPTION OF EMBODIMENTS

Figure 1:
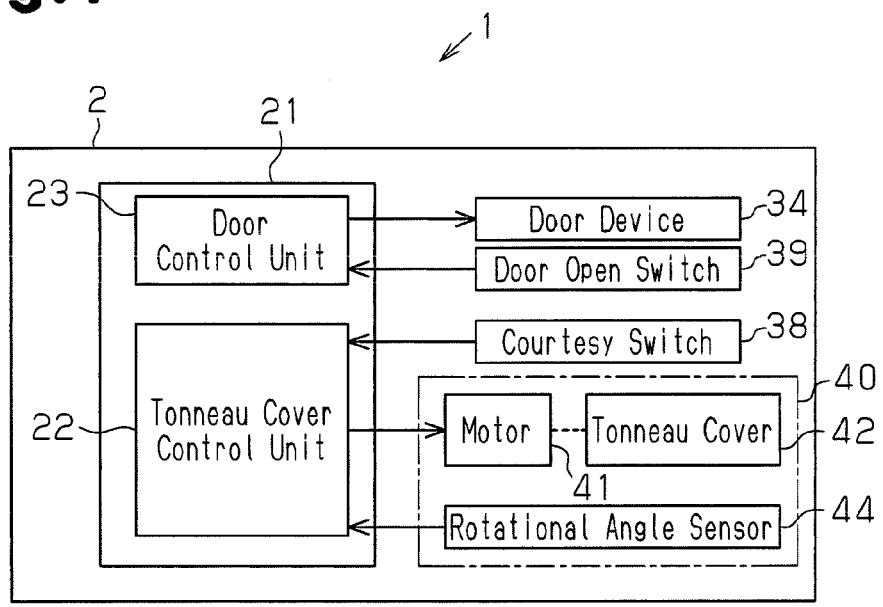
[FIG. 1]

A tonneau cover device 1 according to one embodiment of the present invention will now be described with reference to FIGS. 1 to 4.

An in-vehicle controller 21, which is formed by a computer, includes a tonneau cover control unit 22 and a door control unit 23. The tonneau cover control unit 22 is electrically connected to a courtesy switch 38 and a tonneau cover body 40. The courtesy switch 38 detects the opening and closing of a hinged hatchback door 45 that opens upward.

The door control unit 23 is connected to a door open switch 39 and a door device 34. The door open switch 39 is arranged on an outer side of the hatchback door 45. The door open switch 39, when pushed, sends an operation signal to the in-vehicle controller 21.

When the door open switch 39 is operated in a state in which the hatchback door 45 is unlocked, the in-vehicle controller 21 controls the door device 34 and shifts the hatchback door 45 to a state in which it can be opened. For example, the door device 34 removes a latch from the hatchback door 45 to unlock the hatchback door 45.

Figure 3:
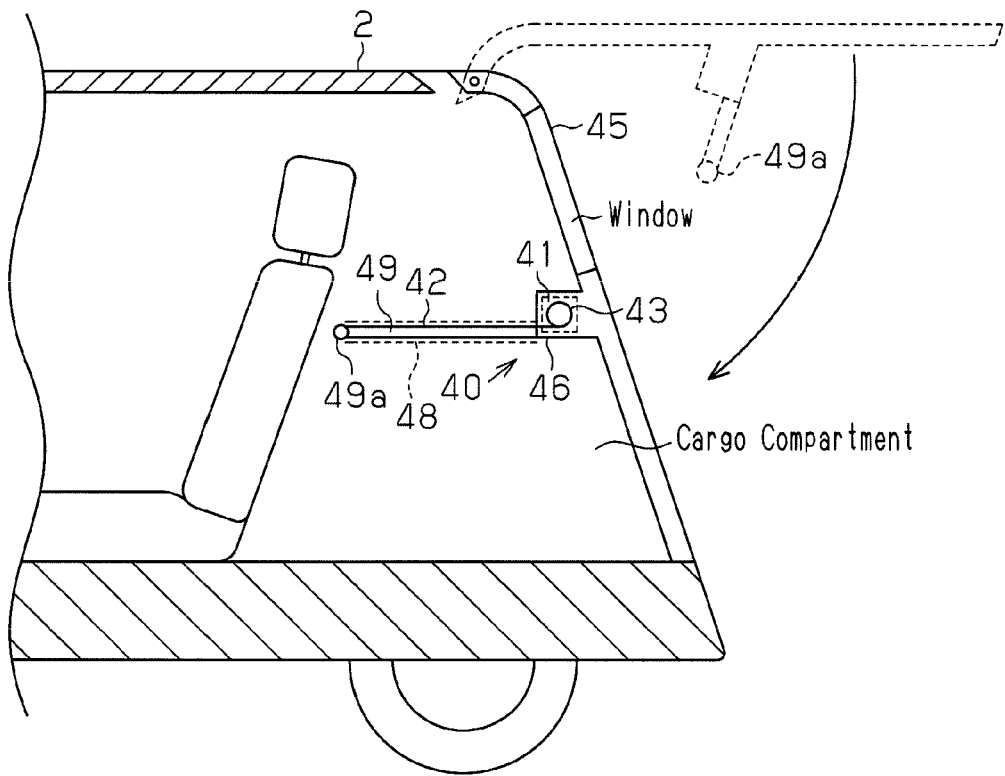
[FIG. 3]
Figure 4:
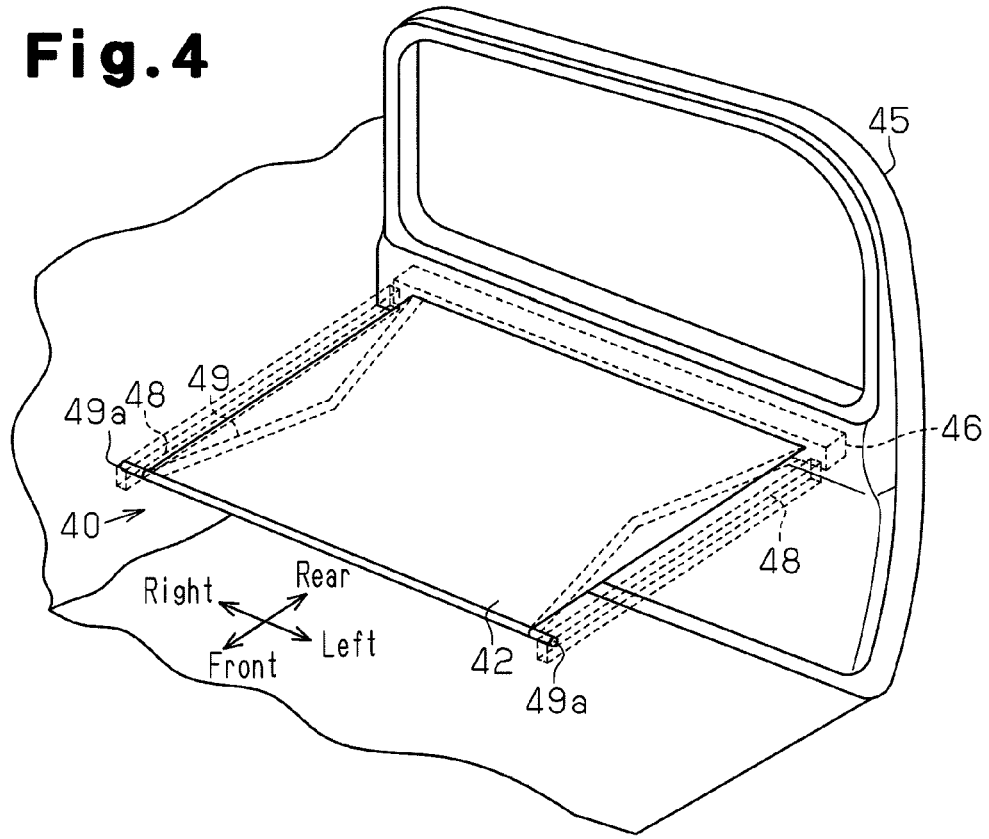
[FIG. 4]

The tonneau cover body 40 has the same structure as that of the referential example shown in FIGS. 3 and 4. Thus, the tonneau cover body 40 will not be described. The tonneau cover device 1 is formed by a controller, such as the tonneau cover control unit 22, and the tonneau cover body 40.

When the tonneau cover control unit 22 determines that the hatchback door 45 is closed based on a signal from the courtesy switch 38, the tonneau cover control unit 22 drives the motor 41 and moves the distal end of the tonneau cover 42 from the storage position to the extension position. When the tonneau cover control unit 22 determines that the hatchback door 45 is open based on a signal from the courtesy switch 38, the tonneau cover control unit 22 drives the motor 41 and moves the distal end of the tonneau cover 42 from the extension position to the storage position.

The tonneau cover body 40 may include a rotational angle sensor 44, which is formed by, for example, a rotary encoder. The rotational angle sensor 44 detects a rotational angle of the roller 43 and outputs a signal that is in accordance with the detected angle. The rotational angle sensor 44 is one example of a tonneau cover sensor that detects the position and movement of the tonneau cover 42. The rotational angle sensor 44 and the tonneau cover control unit 22 form a detector that detects when movement of the tonneau cover 42 is obstructed.

When the motor 41 is being driven and the signal from the rotational angle sensor 44 indicates that the roller 43 is not rotating, the tonneau cover control unit 22 determines that movement of the tonneau cover 42 is being obstructed due to contact of the tonneau cover 42 or the link mechanism 49 with an object. The rotational angle sensor 44 and the tonneau cover control unit 22 form a detector that detects that movement of the tonneau cover 42 is obstructed.

Figure 2:
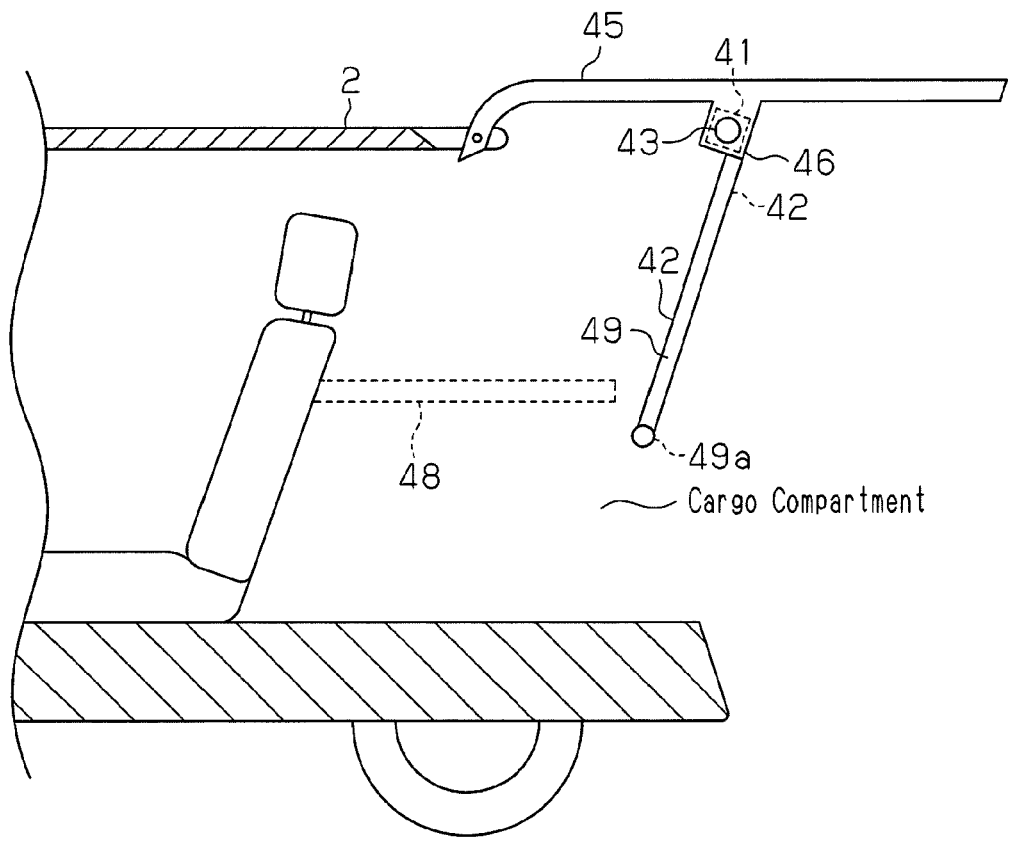
[FIG. 2]

As the tonneau cover 42 moves from the extension position to the storage position when the hatchback door 45 opens, the tonneau cover control unit 22 may detect obstruction of the movement of the tonneau cover 42. In such a case, the tonneau cover control unit 22 reverses the movement direction of the tonneau cover 42 and moves the tonneau cover 42 to the extension position. As a result, as shown in FIG. 2, when the hatchback door 45 is completely open, the tonneau cover 42 is located at the extension position. In this state, the movable guides 49a are separated from the fixed guides 48. However, the movable guides 49a are located in the proximity of the rear ends (right side as viewed in FIG. 2) of the fixed guides 48. The positions and shapes of the fixed guides 48 and the tonneau cover body 40 (movable guides 49a) are set to realize such a proximal state. The movable guides 49a move integrally with the tonneau cover 42.

When the hatchback door 45 is moved in the closing direction in a state in which the movable guides 49a are separated from the fixed guides 48, the vehicle body interferes with the tonneau cover 42 or the link mechanism 49. Thus, the hatchback door 45 cannot be completely closed. Accordingly, instead of closing the hatchback door 45, the user first places the movable guides 49a on the fixed guides 48 in a state in which the hatchback door 45 is fully open. This is relatively simple because the movable guides 49a of the tonneau cover 42, which is at the extension position, are located near the fixed guides 48. The user then closes the hatchback door 45. This moves the movable guides 49a along the fixed guides 48 while the tonneau cover 42 remains held at the extension position. Accordingly, when the hatchback door 45 is completely closed, the tonneau cover 42 conceals cargo arranged under the tonneau cover 42.

As long as the tonneau cover control unit 22 detects no obstructions during movement of the tonneau cover 42 from the extension position to the storage position when the hatchback door 45 is opening, the tonneau cover 42 will reach the storage position when the hatchback door 45 fully opens. When the hatchback door 45 is closed from this state, the tonneau cover control unit 22 moves the tonneau cover from the storage position to the extension position. Accordingly, when the hatchback door 45 is fully closed, the tonneau cover 42 conceals cargo arranged under the tonneau cover 42. When the tonneau cover control unit 22 detects an obstruction during movement of the tonneau cover 42 toward the extension position, the tonneau cover control unit 22 reverses the movement direction of the tonneau cover 42 and moves the tonneau cover 42 toward the storage position by a length that is sufficient for resolving contact with the obstruction. This avoids a state in which the contact of the tonneau cover 42 with an object applies excessive load to the tonneau cover 42 and object.

The present embodiment has the advantages described below.

(1) As the hatchback door 45 opens and the tonneau cover 42 moves toward the storage position, when contact of the tonneau cover 42 with an object is detected, the tonneau cover control unit 22 moves the tonneau cover 42 to the extension position. When the hatchback door 45 fully opens, the tonneau cover 42 is at the extension position and the movable guides 49a are located in the proximity of the fixed guides 48. This allows for the user to place or join the tonneau cover 42 on the fixed guides 48 when the hatchback door 45 is fully open. This improves convenience. Thus, the user does not have to hold the hatchback door 45 in a partially closed state to place the movable guides 49a on the guides 48.

(2) When the hatchback door 45 opens and movement of the tonneau cover 42 to the storage position is obstructed, the tonneau cover 42 is moved to the extension position. Thus, the tonneau cover 42 may be controlled to move to only two positions, namely, the extension position and the storage position. This simplifies the movement control of the tonneau cover 42 when the hatchback door 45 opens. Further, a control for stopping the tonneau cover 42 at a certain position between the storage position and the extension position can be eliminated when the hatchback door 45 opens.

It should be apparent to those skilled in the art that the present invention may be embodied in many other specific forms without departing from the spirit or scope of the invention. Particularly, it should be understood that the present invention may be embodied in the following forms.

In the above embodiment, the courtesy switch 38 is a door sensor that detects the closing and opening of the hatchback door 45. However, as long as the opening and closing of the hatchback door 45 can be detected, a door sensor other than the courtesy switch 38 can be used. For example, when a door open switch arranged at the outer side of the hatchback door 45 is operated thereby moving a latch (lock) to an unlock position from a lock position, the hatchback door 45 can be opened. In this case, the door sensor may be latch switch that detects whether the latch is located at the unlock position or unlock position. When the tonneau cover control unit 22 determines with the latch switch that the latch has been moved from the lock position to the unlock position, the tonneau cover control unit 22 determines that the hatchback door 45 has been opened and moves the tonneau cover 42 from the extension position to the storage position.

The tonneau cover 42 is a soft sheet of a fabric or the like. However, the tonneau cover 42 may be hard and include a plurality of separate plates. In this case, a link mechanism joins the plates. Such a tonneau cover folds and stacks the plates when at the storage position. When spreading out the tonneau cover from the storage position to the extension position, the plates lie along the same plane.

In the above embodiment, as the hatchback door 45 opens and the tonneau cover 42 moves to the storage position, when movement of the tonneau cover 42 is obstructed, the tonneau cover control unit 22 moves the tonneau cover 42 to the extension position. The extension position is one example of a contactable position of the tonneau cover 42 at which the movable guides 49a at the distal side of the tonneau cover 42 can come into contact with or be joined with the fixed guides 48 when the hatchback door 45 is open. The tonneau cover control unit 22 may store or hold a set value of an extension length corresponding to the contactable position, and the motor 41 may be driven and controlled in accordance with the set value of the extension length. The contactable position does not have to be the extension position as long as the movable guides 49a at the distal side of the tonneau cover 42 can easily be placed on the fixed guides 48. For example, the contactable position may correspond to the length of the tonneau cover 42 when the movable guides 49a are closest to the ends of the fixed guides 48. This allows the movable guides 49a to be easily placed on the fixed guides 48 regardless of the positions and shapes of the tonneau cover 42 and the fixed guides 48.

In the above embodiment, the tonneau cover control unit 22 is arranged in the in-vehicle controller 21. However, the tonneau cover control unit 22 may be discrete from the in-vehicle controller 21.

In the above embodiment, an urging member such as a spring is used to roll the tonneau cover 42 onto the roller 43, and a motor is used to extend and retract the link mechanism 49. Instead, an urging member such as a spring may be used to urge the link mechanism 49 to move the tonneau cover 42 to the storage position, and a motor may be used to rotate the roller 43. This obtains the same advantages as the above embodiment.

The hatchback door 45 is one example of a door at the back of a vehicle.

Two or more of the above modifications may be combined.

A technical concept that can be acknowledged from the above embodiment will be described together with its advantage.

The tonneau cover device according to claim 1 or 2, further comprising a motor that moves the tonneau cover to a storage position or an extension position; a link mechanism coupled to the tonneau cover and including the movable guide; a roller rotated to roll up the tonneau cover or roll out the tonneau cover; a case arranged in the door, wherein the case rotatably supports the roller; and a rotation sensor that detects rotation of the roller, wherein the controller determines that movement of the tonneau cover to the storage position is obstructed when the rotation sensor detects that rotation of the roller is stopped. The tonneau cover device determines whether or not movement of the tonneau cover has been obstructed with a simple structure.

The present examples and embodiments are to be considered as illustrative and not restrictive, and the invention is not to be limited to the details given herein, but may be modified within the scope and equivalence of the appended claims.

The invention claimed is:

1. A tonneau cover device comprising:
   a tonneau cover that includes a basal end, which is attached to an inner side of a door at the back of a vehicle, and an opposite distal end;
   a movable guide arranged on the tonneau cover, wherein the movable guide is guided by a fixed guide, which is arranged in the vehicle to move the movable guide in a horizontal direction;
   a motor, included in a tonneau cover body arranged in the door to move the tonneau cover to an extension position, at which the distal end is farthest from the basal end, when the door closes, and to move the tonneau cover to a storage position, at which the distal end is closest to the basal end, when the door opens;
   a detector that detects whether movement of the tonneau cover is obstructed due to contact with an object; and
   a controller that controls the motor to move the tonneau cover to a contactable position at which the movable guide can come into contact with or be joined with the fixed guide in a state in which the door is open when the detector detects that the movement of the tonneau cover to the storage position has been obstructed.

2. The tonneau cover device according to claim 1, wherein the movable guide is formed to become closer to the fixed guide as the tonneau cover approaches the extension position from the storage position when the door is open, and the contactable position at which the movable guide can come into contact with or be joined with the fixed guide in a state in which the door is open is the extension position.

3. A tonneau cover device used with a fixed guide arranged in a cargo compartment of a vehicle, the tonneau cover device comprising:
- a tonneau cover stored in a tonneau cover case arranged in a hinged hatchback door of the vehicle that opens upward, wherein the tonneau cover is movable between a storage position and a maximum extension position;
- a motor stored in the tonneau cover case arranged in the hatchback door, the motor being coupled to the tonneau cover to move the tonneau cover with respect to the tonneau cover case to the storage position and the maximum extension position;
- a tonneau cover sensor that detects a position and movement of the tonneau cover;
- a movable guide moved integrally with the tonneau cover while contacting the fixed guide when the tonneau cover moves in the cargo compartment, wherein the movable guide is separated from the fixed guide when the hatchback door is fully open; and
- a controller connected to a door sensor that detects when the hatchback door opens, wherein the controller drives the motor in accordance with signals provided from the door sensor and the tonneau cover sensor, the controller stores a set value of an extension length corresponding to a contactable position of the tonneau cover that allows the movable guide to contact the fixed guide when the hatchback door is fully open, and when detecting that the tonneau cover has stopped moving toward the storage position during a period from when the hatchback door starts to open to when the hatchback door fully opens, the controller drives the motor in accordance with the extension length set value to move the tonneau cover to the contactable position that allows the movable guide to contact the fixed guide when the hatchback door is fully open.

4. The tonneau cover device according to claim 3, wherein the controller stores the extension length set value that corresponds to the maximum extension position.

5. The tonneau cover device according to claim 3, wherein the extension length set value corresponds to a length of the tonneau cover at which the movable guide is closest to the fixed guide when the hatchback door is fully open.

* * * * *